Dec. 5, 1967     K. CAUSEMANN     3,355,766

HOT MELT SCREW EXTRUDER

Filed Nov. 5, 1965

INVENTOR:
KARL CAUSEMANN
BY
Marzall, Johnston, Cook & Root
ATT'YS

United States Patent Office 3,355,766
Patented Dec. 5, 1967

3,355,766
HOT MELT SCREW EXTRUDER
Karl Causemann, Wermelskirchen, Germany, assignor to Barmer Maschinenfabrik Aktiengesellschaft, Wuppertal-Oberbarmen, Germany
Filed Nov. 5, 1965, Ser. No. 506,491
Claims priority, application Germany, Nov. 12, 1964, B 79,300
9 Claims. (Cl. 18—12)

ABSTRACT OF THE DISCLOSURE

A screw extruder for a hot thermoplastic melt having a threaded screw shaft connected to a drive shaft, both of which are received in an elongated bore of a stationary housing, with mechanical sealing means located at the point of transition between the screw shaft and the drive shaft. The mechanical sealing means includes a collar on the screw shaft with an outer diameter intermediate the shaft diameter and the thread diameter, and a bearing sleeve which is pressed axially against the opposing annular face of the collor and mehanically seals the annular space around the drive shaft adjacent the collar. The thread is extending to run continuously over the circumference of the collar up to the plane of the annular face in contact with the sleeve, thereby permitting the sealing means to be maintained at a high temperature by the continuous flow of fresh hot melt on the collar.

---

This invention relates to a hot melt screw extruder for the processing of thermoplastic materials, and more particularly, the invention is concerned with means for sealing the screw extruder against the flow of a molten plastic material at the point of transition between the screw shaft and its connected drive shaft in the surrounding stationary housing or casing in which these connected shafts rotate.

It is often desirable to process thermoplastic materials, especially thermoplastic synthetic polymers, in a screw extruder under elevated temperatures whereby the molten polymer is conveyed and mixed by the screw in an elongated barrel or cylinder and then forced through an extrusion head or die. Where the thermoplastic material is fed into the screw in the form of solid particles or granules, certain disadvantages such as a less satisfactory mixing effect are encountered.

Therefore, it has been proposed that the thermoplastic materials be introduced through an inlet opening of the housing to the feed end of the screw in a relatively fluid or plasticized form, e.g. with a viscous or honey-like consistency. When working in this manner with a premelted thermoplastic material, it is quite important to seal the entry or feed zone of the screw at precisely that point at which the threaded screw shaft emerges from the housing into the cylindrical space of the extruder barrel. Sealing at this point must be sufficiently effective to prevent even the most liquid melt from forcing its way backwards around the screw shaft and through the housing toward the gears which operate the driveshaft. Leakage of hot molten thermoplastic material at this transition point between the screw shaft and the drive shaft not only results in a loss of material but also tends to cause damage to the apparatus itself.

Attempts have been made to seal off the entry zone of the screw extruder by using some form of packing or stuffing members in combination with the shaft housing, for example by using conventional packing rings composed of graphite, carbon or the like, or by using conventional stuffing boxes, especially with asbestos as the recommended stuffing material. These techniques for sealing the feed zone of the screw either fail to provide a satisfactory seal or, depending upon the material used, are disadvantageous in that they chemically influence the melt or allow traces of the hot molten material to penetrate into gaps of the packing where the hot material decomposes or solidifies and thereby slowly impairs the functioning of the packing and finally completely nullifies its effect.

It is a primary object of the present invention to provide sealing means in combination with a hot melt screw extruder whereby one can effectively prevent the flow of molten thermoplastic material at the point of transition between the screw shaft and its connected drive shaft, i.e. to prevent such flow of the melt from the cylindrical space around the screw portion of the shaft in the feed zone of the extruder back through the wall of the housing and around the rotating drive shaft.

Another object of the invention is to provide a sealing means of the type described in a holt melt screw extruded which is capable of withstanding relatively high pressures and temperatures and which is highly effective over a long period of operation.

Still another object of the invention is to provide the necessary sealing means in the form of a relatively simple structural components which can be easily assembled and disassembled for purposes of economy.

Yet another object of the invention is to provide a sealed drive shaft in a holt melt screw extruder together with means for applying heat at the point of sealing in order to prevent solidification of the melt and consequent freezing or damage to the drive shaft and the associated bearing surfaces.

It has now been found, in accordance with the present invention, that these and other advantages can be achieved in a hot melt screw extruder having a stationary housing with an elongated barrel longitudinally bored to receive a screw shaft connected to a drive shaft, the screw being adapted to convey a molten thermoplastic material through the barrel, by employing in combination therewith: sealing means in the longitudinal bore of said housing at the point of transition between the screw shaft and its connected drive shaft including a cylindrical collar on the screw shaft, a cylindrical bearing sleeve positioned around the drive shaft adjacent to the collar so as to close off an annular space between the housing and the drive shaft, the bearing sleeve being slidable longitudinally along the axis of the drive shaft and secured to the housing to prevent its rotation, and pressure means to urge the bearing sleeve in contact against the opposing annular face of the collar, at least one of the contacting faces of the sleeve and the collar being constructed of a wear-resistant material. Also, it is especially preferred that the combination according to the invention include means to supply heat to that portion of the housing surrounding the point of transition between the screw shaft and the drive shaft, thereby maintaining a relatively high temperature at this point which not only improves the operation of the screw but also precludes any substantial cooling or solidification of the melt on the rotating drive shaft or the bearing walls of the housing.

A preferred embodiment of the invention exhibiting the above noted objects and advantages will now be described by the following detailed specification taken in conjunction with the accompanying drawing wherein.

Figure 1:
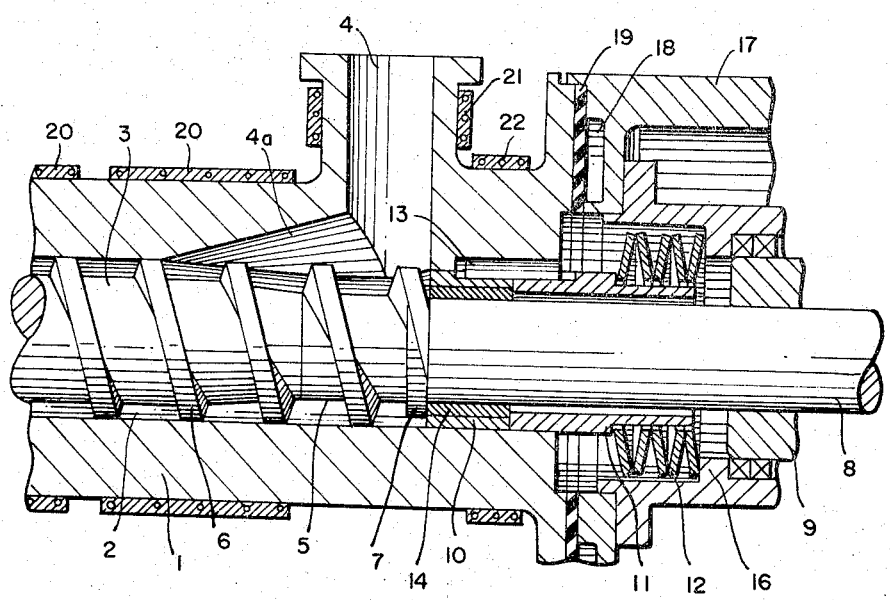
FIG. 1 is a cross-sectional view taken along the longitudinal axis of the screw extruder corresponding to the axis of the screw shaft and its connected drive shaft, only that portion of the screw extruder being illustrated as corresponds to the feed or entry zone of the screw and the elements immediately preceding and succeeding this entry zone.

As shown in FIG. 1, the stationary housing is represented in part by an elongated barrel or cylinder 1 having a longitudinal bore or screw space 2 adapted to receive the screw 3 and various components associated therewith. An inlet opening 4 is arranged in the housing at a right angle to the longitudinal axis of the screw 3, and this opening is preferably enlarged at the point of entry into the feed zone of the screw space, the enlarged section 4a gradually tapering downwardly in the direction of flow of the molten material being conveyed.

The conveying screw or worm 3 consists of the screw shaft 5, the screw thread 6 and an annular offset or collar 7, as well as the drive shaft 8. This drive shaft 8 is seated firmly in a rotatable secondary or linking drive shaft 9 so as to prevent movement of the screw in a longitudinal direction, i.e. so that the screw cannot slide in the direction of its longitudinal axis backwards or to the right with reference to the stationary housing under the back pressure exerted by the molten material being conveyed under compression by the screw. In other words, the rotatable screw 3 and its interconnected or common shafts 5 and 8 remain in a substantially fixed longitudinal position with reference to the stationary housing, and the back annular face of the collar 7 is thus also maintained in an approximately fixed position falling in a plane at right angles to the axis of the screw, this plane preferably being identical to the transition point between the drive shaft 8 and the screw shaft 5. While in this relatively fixed longitudinal position, the screw is rotated by means of an extruder gear (not shown) or any other suitable drive mechanism operatively connected to the secondary shaft 9.

That portion of the housing 1 behind the feed zone of the screw is bored to a diameter larger than the diameter of the drive shaft so as to leave an annular gap space between the cylindrical surface of the drive shaft and the inner walls of the bored housing. As shown in FIG. 1, this bore behind the feed zone is preferably a continuation of the bored space 2 which has been provided for the screw 3, i.e. such that the threaded screw can if desired be drawn backwardly through the housing for replacement or repair.

At the collar 7 corresponding to the transition point between the drive shaft 8 and the screw shaft 5, the annular space between the drive shaft and the housing is closed off or sealed by the bearing sleeve 10 positioned around the drive shaft 8, this bearing sleeve being slidable longitudinally along the axis of the drive shaft. A second cylindrical sleeve or piston member 11 is also mounted around the drive shaft 8 behind and in contact with the bearing sleeve 10, and both sleeves are pressed forward by a suitable spring or pressure means 12 so that the forward edge or annular face of the bearing sleeve 10 is urged in contact against the opposing annular back face of the collar 7 while completely sealing the open space around the drive shaft. At least the inner lining of the bearing sleeve 10 is lined with a wear-resistant material 14, for example by means of a centrifugal casting process, so as to provide a good bearing surface for the drive shaft 8 and also providing a front annular face on the sleeve which acts as a bearing surface against the opposing annular face of the collar 7. In this manner, the wear-resistant inner layer or lining 14 is an integral part of the bearing and sealing sleeve 10.

Figure 2:
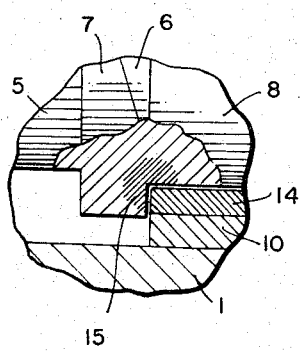
FIG. 2 is an enlarged view with a section taken away at the transition point between the screw shaft and the drive shaft as encircled by the broken lines II of FIG. 1.
Figure 3:
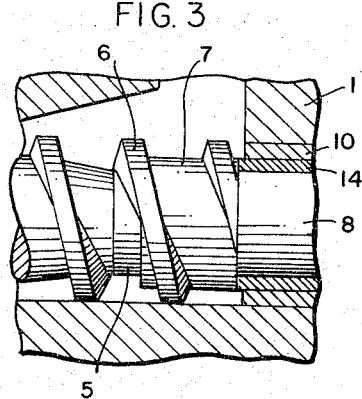
FIG. 3 is a further detailed view of a portion of the apparatus of FIG. 1.

As illustrated in FIG. 2, a wear-resistant ring 15 at the transition point corresponding to the juncture of the back annular face of the collar 7 and the circumference of the drive shaft 8 is quite advantageous and can be obtained, for example, by surface welding or surface hardening completely around the circumferential end of the drive shaft at this point of juncture. Suitable metal alloys or other wear-resistant materials for the lining 14 and ring 15 can be readily selected by those skilled in the art so as to provide good bearing surfaces and also to provide a tight running seal preventing passage of molten thermoplastic material being processed by the screw. For example, in the particular device illustrated herein, the wear-resistant materials selected for the bearing and sealing surfaces consisted of nickel-cobalt alloys or nickel-chromium-boron alloys. However, it is also feasible to use other well-known alloys or wear-resistant materials, such as polytetrafluoroethylene, this latter material being especially preferred in those cases in which only one of the two opposing annular surfaces is to be coated.

The two sleeves 10 and 11 are prevented from turning or rotating around the longitudinal axis of the screw by means of a key or lock spring 13 fitted into a suitable slot in the two sleeves and the adjoining wall of the bore in the housing. By spacing the inner surface of the linking or piston sleeve 11 a short distance from the cylindrical surface of the drive shaft 8, it is possible to substantially reduce the amount of bearing surface on the drive shaft, and after relatively long periods of operation, it is only necessary to replace the much smaller bearing sleeve 10. In addition, by using a relatively long piston sleeve 11, it is possible to position the spring 12 or other pressure means at a distance from the hot melt in the screw and the heated housing around the screw so as to avoid any substantial transfer of heat to the pressure means.

The spring 12 illustrated in FIG. 1 is in the form of a plate spring pack or a so-called multiple washer spring which is held under compression on one end by the annular shoulder 16 of the shaft housing or gear casing which is merely a continuation or connected element of the stationary housing 1. The other end of the plate spring pack is held in compression by a suitable annular shoulder on the cylindrical sleeve 11. Instead of a plate or multiple washer spring, it is also possible to use other elastic or spring elements such as a spiral or helical spring adapted to fit around the cylindrical piston sleeve 11 and urge it forward together with the bearing sleeve 10 against the collar 7. It will also be apparent that one can use a suitable hydraulic or pneumatic pressure system in order to achieve the desired forward movement of the sleeves in closing off the annular space forming the transition point between the drive shaft and the screw shaft.

The collar 7 should have an outer diameter which is larger than the screw shaft and its connected drive shaft but which is smaller than the diameter of the screw thread, and it is then particularly desirable to extend the screw thread continuously over the circumference of the collar up to the plane of the annular rear face of the collar which contacts the bearing sleeve 10. With this construction, the screw thread which runs out from the radial plane of the rear face of the collar causes a continuous change of molten material at this location of the sealing means. Thus, as newly introduced hot molten material enters into the feed zone of the screw, it tends to flow continuously over and then away from the collar such that the sealing means are constantly maintained at a sufficiently high temperature to prevent any solidification of thermoplastic material within the sealing means which might then remain permanently to either freeze the shaft or cause severe damage to the bearing surfaces. Furthermore, even if a small amount of thermoplastic material finds its way into the sealing means, sufficient pressure is then exerted by the bearing surfaces to prevent any flow of molten material backwardly along the drive shaft.

Refering again to FIG. 1, the barrel or cylindrical housing 1 can be heated in a conventional manner by means of electrically heated strips or bands 20 or by means of a heating jacket or tubular heat exchange means within the housing itself. It is especially desirable to further use such electrically heated bands 21 and 22 around the feed inlet 4 and that portion of the housing around the sealing means so as to maintain the high temperature of the molten thermoplastic material as it enters the feed zone of the screw and also to maintain a relatively high temperature around the sealing means. This additional supply of heat to that portion of the housing surrounding the feed zone of the screw and the point of transition between the screw shaft and the drive shaft makes it quite certain that a temperature equilibrium will be achieved in the sealing means at a temperature substantially above the melting point of the thermoplastic material. In the adjacent cylindrical casing or in the main bearing or gear casing 17, there is provided a cooling channel 18 which is further insulated from the heated portion of the housing 1 by means of a heat insulating gasket 19 arranged concentrically around the axis of the screw. This cooling channel 18 is adapted to carry a fluid cooling medium and is located at a sufficient distance from the sealing means corresponding to the collar 7 and sleeve 10 such that the high temperature of the sealing means can be maintained. These cooling and insulating means at a distance behind the sealing means provide adequate protection for the main bearing surfaces of the shaft 9 as well as the gear elements of the driving mechanism.

It will be apparent that various modifications can be made in these heating and cooling means without departing from the spirit or the scope of the present invention. For example, in place of the heated band 22, a tubular channel can be provided in the rear portion of the housing 1 in proximity to the bearing sleeve 10 in order to supply heat to this member with a fluid heat exchange medium. Cooling channels can likewise be arranged in different positions in the adjacent portion of the housing which encases the spring or other pressure means 12, the drive mechanism and the drive shaft 9. Although very little heat is transmitted by the cylindrical linking sleeve 11, the annular chamber containing the spring 12 can also be insulated.

The construction and arrangement of the sealing means of the invention in combination with a hot melt screw extruder, as described above, permits good heat transfer from the continuously supplied melt as it enters the feed zone of the screw and flows over the surfaces directly adjacent to the transition point between the drive shaft and the worm shaft, thereby ensuring a tight seal around the drive shaft. Furthermore, this sealing means with the special construction of the collar overlaid by the conveying screw thread is highly effective even when processing extremely fluid molten materials. There is considerably less damage to bearing surfaces when using the device of the invention other than the normal wear encountered with the particular materials chosen for the bearing surfaces. The bearing sleeve which cooperates with the collar in the sealing means is relatively small and inexpensive and can be easily replaced, if necessary, during the normal periodic shut-down for inspection or cleaning of the apparatus. Since the sealing means of the invention are strong, rigid, structural members consisting of inert metals and/or having bearing and sealing surfaces composed of materials which are inert to hot molten thermoplastic polymers, the various surfaces of these structural members can be exposed to the hot thermoplastic polymer for a long period of time without damaging the sealing means and without degrading the polymer or adding undesirable components thereto.

The particular embodiments of a sealing means in combination with a hot melt screw extruder as disclosed in the foregoing specification and the drawing have been presented merely by way of example, and the invention is not to be limited other than as defined in the appended claims.

The invention is hereby claimed as follows:

1. In a hot melt screw extruder having a stationary housing with an elongated barrel longitudinally bored to receive a screw shaft connected to a drive shaft, said screw being adapted to convey a molten thermoplastic material through said barrel, and sealing means in the longitudinal bore of said housing to prevent the axial flow of said thermoplastic melt backwardly along said drive shaft, the improvement comprising mechanical sealing means at the point of transition between said screw shaft and said drive shaft including a cylindrical collar on said screw shaft having an outer diameter larger than the diameter of the screw shaft and smaller than the diameter of the screw thread, a cylindrical bearing sleeve positioned around said drive shaft adjacent said collar so as to close off an annular space between said housing and said drive shaft, said sleeve being slidable longitudinally along the axis of said drive shaft and secured against rotation to the housing, pressure means to urge the sleeve in contact against the opposing annular face of said collar, at least one of the contacting faces of said sleeve and said collar being constructed of a wear-resistant material, and a screw thread extension running continuously over the circumference of said collar up to the plane of the annular face of said collar which contacts said sleeve.

2. A hot melt screw extruder as claimed in claim 1 wherein said pressure means comprises a spring arranged concentrically around said drive shaft and operatively connected under compression thereof to said bearing sleeve.

3. A hot melt screw extruder as claimed in claim 2 wherein said spring is a plate spring.

4. A hot melt screw extruder as claimed in claim 2 wherein said spring is maintained under compression by means of a second longitudinally slidable, non-rotatable cylindrical sleeve interposed between said spring and said bearing sleeve, said second sleeve having an inner diameter sufficiently large to provide an annular gap space around said drive shaft.

5. A hot melt screw extruder as claimed in claim 1 wherein said bearing sleeve has an inner lining of wear-resistant material to act as a bearing surface for said drive shaft.

6. A hot melt screw extruder as claimed in claim 5 wherein said bearing sleeve has an outer diameter greater than the outer diameter of said collar, and said inner lining of said bearing sleeve provides an annular end face of approximately the same diameter as that of the collar.

7. A hot melt screw extruder as claimed in claim 1 in further combination with means to supply heat to the housing surrounding the point of transition between said screw shaft and said drive shaft.

8. A hot melt screw extruder as claimed in claim 7 wherein said housing includes cooling means around the drive shaft a short distance behind said bearing sleeve to reduce the flow of heat backwards through said housing and along said drive shaft.

9. A hot melt screw extruder as claimed in claim 8 wherein said housing contains insulating means inserted between said heated portion and said cooled portion to reduce the transfer of heat therebetween.

References Cited

UNITED STATES PATENTS

| | | |
|---|---|---|
| 591,520 | 10/1897 | Zoeller. |
| 1,905,772 | 4/1933 | Walton _____ 277—87 X |
| 2,049,955 | 8/1936 | Gilbert _____ 277—87 |
| 2,233,599 | 3/1941 | Gilbert _____ 277—87 |
| 2,369,359 | 2/1945 | MacWilliam et al. |
| 2,692,405 | 10/1954 | Gayler _____ 18—12 X |
| 2,838,790 | 6/1958 | Hartman _____ 18—12 X |
| 2,824,759 | 2/1958 | Tracy _____ 277—87 X |
| 3,199,145 | 8/1965 | Tiemersma _____ 18—12 |

WILLIAM J. STEPHENSON, *Primary Examiner.*

UNITED STATES PATENT OFFICE
CERTIFICATE OF CORRECTION

Patent No. 3,355,766 December 5, 1967

Karl Causemann

It is certified that error appears in the above identified patent and that said Letters Patent are hereby corrected as shown below:

Column 1, line 22, "collor" should read -- collar --; line 24, "extending" should read -- extended --. Column 2, line 20, "extruded" should read -- extruder --. Column 6, between lines 71 and 72, insert -- 3,168,290  2/1965  Wallace ---- 12-12X --.

Signed and sealed this 25th day of November 1969.

(SEAL)
Attest:

Edward M. Fletcher, Jr.  WILLIAM E. SCHUYLER, JR.
Attesting Officer  Commissioner of Patents